Nov. 21, 1933.    C. A. RUESENBERG    1,936,031
FRICTION CLUTCH
Filed Jan. 25, 1932    2 Sheets-Sheet 2

Inventor
Carl A. Ruesenberg
By
Wilson, Dowell, McKenna & Rehm
Attys.

UNITED STATES PATENT OFFICE 1,936,031

FRICTION CLUTCH

Carl A. Ruesenberg, Rockford, Ill., assignor to Rockford Drilling Machine Co., Rockford, Ill., a corporation of Illinois Application January 25, 1932. Serial No. 588,559

6 Claims. (Cl. 192—70)

This invention relates to friction clutches for general use, although the present design is especially adapted for use on motor vehicles.

This invention is an improvement on that disclosed in my copending application, Serial No. 444,159, filed April 14, 1930, relating to a clutch in which the pressure plate and the usual arrangement of springs that went with it are eliminated, and in place of the ordinary disc, a special disc is used made up of two sections, a ring section which has a facing for engagement with the flywheel, and a plate section which has a facing for engagement with the back plate, the two sections being normally spread apart under the action of springs disposed therebetween. Release levers, instead of being mounted on the back plate and cooperating with a pressure plate, are pivotally connected near the outer ends to the plate section of the clutch disc and pivotally connected at the outer ends to the ring section, and an abutment is provided on the driven shaft for the clutch disc center, so that upon initial movement of the levers, the plate section is disengaged, and upon further movement, after engagement of the clutch disc center with its abutment, the ring section is disengaged, and vice versa on the return movement of the levers.

In accordance with the present invention, I provide annular flanges on the plate and ring sections of the clutch disc extending inwardly toward each other for reinforcement, so that the sections while adapted to flex are not apt to become permanently distorted, and also provide lugs projecting from these flanges for the purpose of interlocking the plate and ring sections, both for the purpose of making them turn together as a unit and keeping the sections in true concentric relation.

In the drawings—

Fig. 3 is a fragmentary section similar to Figure 1, but showing a modified or alternative construction, and Fig. 4 is a detail to better illustrate the construction of Fig. 3.

Similar reference numerals are applied to corresponding parts throughout the views.

Figure 1:
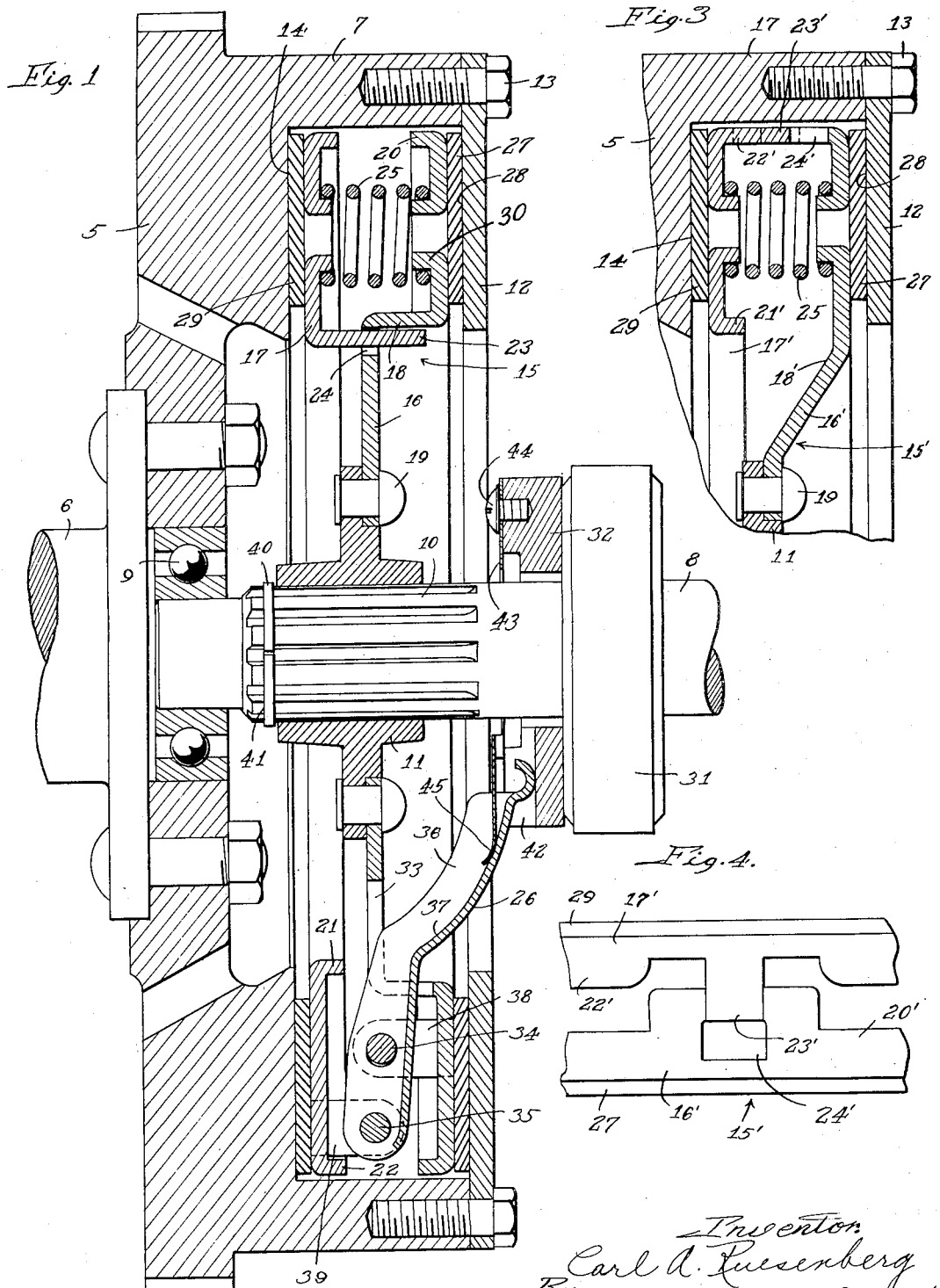
Figure 1 is a section through a flywheel showing the clutch of my invention assembled thereon.
Figure 2:
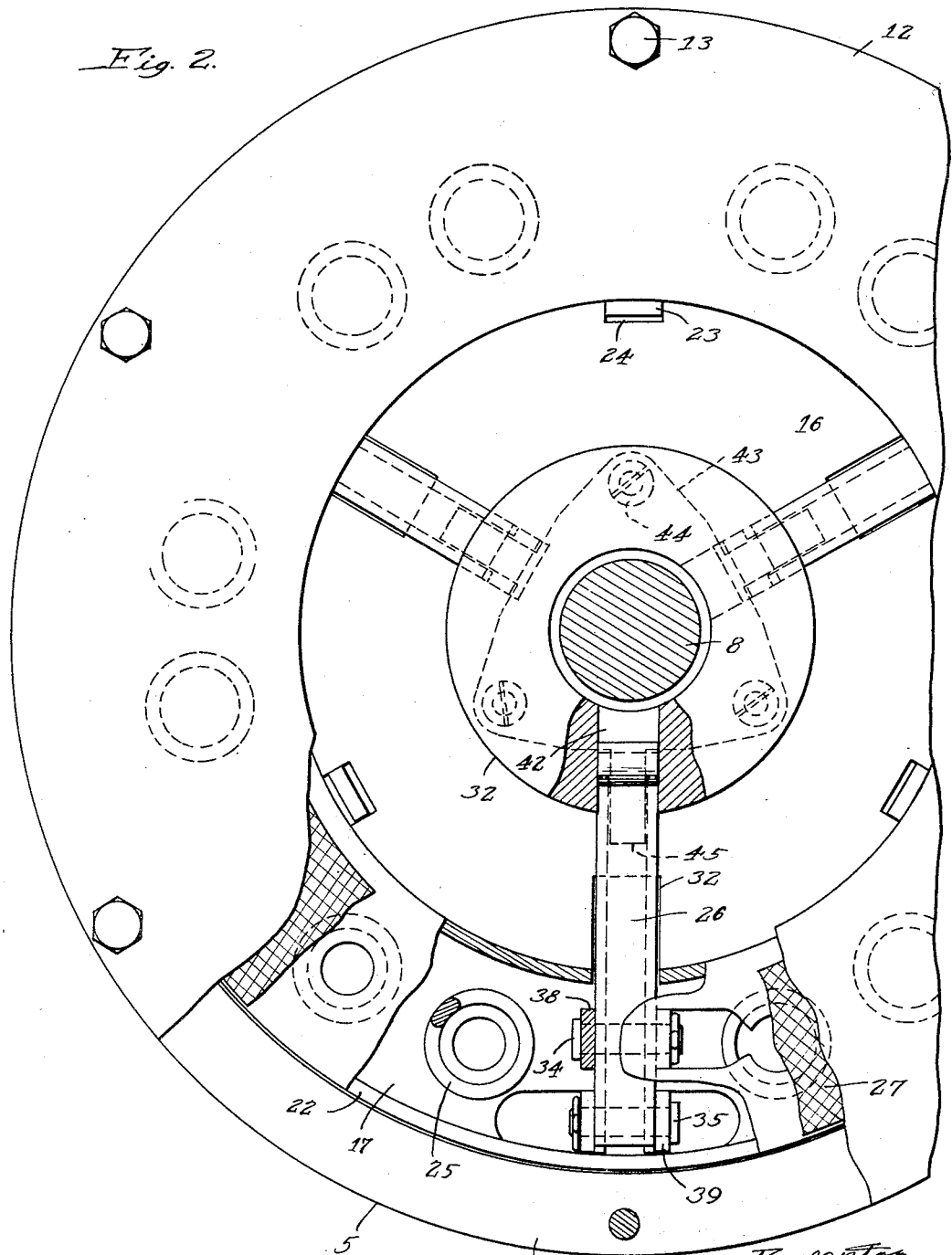
Fig. 2 is a rear view showing certain parts broken away for the purpose of better illustration.

Referring first to Figs. 1 and 2, the reference numeral 5 is applied to the flywheel mounted in the usual way on the rear end of the engine crank shaft 6 and constituting the housing for and driving element of the clutch housed within the integral annular rim 7 projecting rearwardly from the flywheel, as shown. A shaft 8, constituting the driven element, extends rearwardly from the clutch into the gear box of the transmission, there being ordinarily a housing about the flywheel and clutch assembly at the front end of the gear box, as is well known, and there being also a plate thereon which, when removed, affords access to the clutch for purposes of inspection or adjustment. It is common practice to have the front end of the shaft 8 received in a bearing 9 in the center of the flywheel and to have the shaft splined, as at 10, behind this bearing to take the hub or center 11 of the clutch disc. It is also common practice to fasten the back plate 12 to the rim of the flywheel by means of cap screws 13. In the ordinary clutch, the back face 14 of the flywheel is ground smooth and square with the axis for drive purposes, and the same is true of the front face of the pressure plate, which, however, in accordance with my invention, is eliminated in the present clutch, its place being taken in part by a special clutch disc, indicated generally by the reference numeral 15.

The clutch disc 15 is made of two sections, a circular plate 16 and a circular ring 17, the former being dished centrally, as indicated at 18, and secured to the center 11 as by rivets 19. The plate 16 and ring 17 are stamped from sheet metal for lightness and cheapness, and as will soon appear, to avoid machining cost. The plate 16 is naturally stiffened considerably by the dishing, and it is given additional reinforcement by forming a peripheral flange 20 thereon. Internal and external peripheral flanges are formed on the ring 17, as indicated at 21 and 22, for a similar purpose. A plurality of lugs 23 project from the internal flange 21 of the ring 17 through radial slots 24 provided in the plate 16 and have a close working fit therein, so as to permit relative axial movement between the plate and ring as required for engagement and disengagement of the clutch while holding the plate and ring in true concentric relation. The lugs 23 also assume the drive and keep the ring 17 turning with the plate 16 as a unit. Three of these lugs are provided, as appears in Fig. 2, preferably in equally circumferentially spaced relation. A plurality of coiled compression springs 25, provided preferably in a certain arrangement with reference to the release levers 26, are interposed between the plate 16 and ring 17, tending normally to force them apart; that is, to spread the clutch disc whereby to bring the facing 27 on the plate 16 into frictional engagement with the surface 28 on the inside of the back plate 12, and to bring the pad or facing 29 on the ring 17 into frictional engagement with the back face 14 of the flywheel for drive purposes. The plate and ring are suitably punched to provide circular bosses 30 to fit in the ends of the springs 25 so as to definitely locate and hold the same in position.

From the description thus far it is evident that the elimination of the pressure plate greatly simplifies the clutch, cuts down weight, and eliminates one important element of machining cost. Another advantage growing out of this change is the elimination of the cups or thimbles otherwise required for the springs that cooperated with the pressure plate, these springs, in accordance with my invention, being disposed inside the two-piece clutch disc and being held in place in the novel manner described. It is also obvious that the arrangement makes for greater compactness, and neater appearance as well, because there are no parts projecting from the back plate. The arrangement is also advantageous from the standpoint that the springs are protected from the heated parts by the heat insulation of the pads or facings.

The release levers 26, arranged to be operated in the usual way by a throw-out collar 31, extend substantially radially from an intermediate pressure and concentration ring 32, disposed in front of the collar, through slots 33 provided in the plate 16, for pivotal connection with the plate at 34 near the outer ends of the levers, and pivotal connection with the ring 17 at 35 at the outer ends of the levers. The levers 26 are each of stamped sheet metal construction, channel shaped in cross-section, so as to provide spaced parallel flanges 36 joined by a transverse web 37. This makes for lightness and strength, and the levers are broad enough at their pivots 34 and 35 to provide good bearing support therefor on the clutch disc. The pivot 34 in each case is provided by a pin passed through registering holes in a pair of parallel lugs 38 struck inwardly from the plate 16, the lever being disposed between the lugs with their flanges 36 in abutment with the lugs. The pivot 35 in each case is similarly provided by a pin passed through registering holes in a pair of parallel lugs 39 struck inwardly from the ring 17 and through registering holes in the flanges 36. The holes in the levers 26 for the pivot pins 34 are slightly elongated, as appears in Figure 1 for an obvious reason. Suitable means are provided for holding the pins 34 and 35 in place, as indicated in Fig. 2. The springs 25, it should now be observed, apply pressure to the plate and ring substantially midway between the inner and outer edges of the facings 27 and 29, and hence between the pivots 34 and 35. The advantage of this relationship will be explained presently. In passing, it should also be noted that a split ring 40 is seated in an annular groove 41 provided in the shaft 8 in front of the clutch disc center 11, and that radial grooves 42 are provided in the face of the ring 32 for reception of the inner ends of the levers 26, and a spring plate 43 fastened to the face of the ring 32, as at 44, has radially projecting fingers 45 extending outwardly for engagement in the inner ends of the levers yieldingly to hold the same seated in the grooves 42.

In operation, assuming that the clutch is engaged as illustrated in Figure 1, it is arranged to be disengaged by forward movement of the throw-out collar 31. The initial movement of the release levers 26 results in the disengagement of the facing 27 of the plate 16, the plate together with its center 11 being moved forwardly by means of the levers 26 against the action of the springs 25, until the center 11 comes into engagement with the ring 40, which serves as a stop or abutment for limiting the forward movement of the parts referred to. Thereafter, the continued movement of the release levers 26 results in the backing away of the ring 17 from the flywheel against the action of the springs 25 sufficiently to disengage the facing 29. In other words, the clutch disc is contracted axially out of frictional driving engagement with the drive surfaces 14 and 28 provided on the back face of the flywheel 5 and on the inside of the back plate 12, respectively. The disengagement is absolutely positive and the immediate freeing of the disc is accomplished regardless of whether or not the facing tends to stick, as often occurs. Moreover, it will be seen that after the disengagement of the clutch disc it is not free to spin as in the case of a clutch having the disc free of any connection whatever with the release levers. In the present case, the disc is subjected to a definite braking effect by reason of the fact that the release levers 26 assembled on the clutch disc are held firmly in engagement with the throw-out collar under the action of the compressed springs 25, and, of course, there is an appreciable resistance to the turning of the throw-out collar despite the fact that it usually has an anti-friction thrust bearing. Consequently, the clutch disc is quickly slowed down after disengagement without the use of a special clutch brake. When the clutch is to be engaged, the clutch pedal is released and the throw-out collar 31 permitted to back away in the usual way, thus permitting the facing 29 to come into engagement with the surface 14 and the facing 27 thereafter to come into engagement with the surface 28. The clutch is bound to have a very smooth action because of the gradual engagement and disengagement resulting from the engagement of one section of the disc before the other and disengaging it after the other. It is obvious that this avoids the objectionable grabbing so common in friction clutches. The gradual engagement and disengagement is further brought about as a result of the fact that the facings 27 and 29 are flexed or canted slightly out of their normal plane owing partly to the slight amount of yield of the sheet metal of which the plate 16 and ring 17 are made and partly to the special relationship of the pivots 34 and 35 to the springs 25. For example, when the pin 34 is pulled to the left and the pin 35 to the right, as viewed in Figure 1, the spring pressure active between these points will naturally tend to deflect the inner edge of the ring 17 to the left and the periphery of the plate 16 to the right. Consequently, the facing 27 will disengage first at its inner edge portion and finally at its outer edge portion, whereas the facing 29 will disengage first at its outer edge portion and finally at its inner edge portion. Conversely, in the engagement of the clutch, the facing 29 will become engaged first at its inner edge portion and finally at its outer edge portion, and thereafter the facing 27 will become engaged first at its outer edge portion and finally at its inner edge portion. This kind of engagement of a clutch disc is much sought after in clutch design, and, so far as I am aware, has not been satisfactorily attained. In many cases, this sort of engagement is dependent upon resilience of the clutch disc built into it by special forming and treatment, but the objection to that lies in the fact that the disc after so much distortion and being subjected to heat takes a set and there can be no further gradual engagement. In the present case, the disc when the clutch is engaged is undistorted and consequently there is nothing to affect the gradual engagement and disengagement of the clutch. It naturally follows that a clutch properly designed for gradual engagement and disengagement will give longer service because the facings are not subjected to so much destructive action.

In Figs. 3 and 4, illustrating a modified or alternative construction, a clutch disc 15' is illustrated comprising a plate section 16' and ring section 17' with pads or facings 27 and 29, respectively, provided thereon. In this case, similarly as in the other, the plate section is illustrated as dished in the central portion 18' and as having an annular peripheral flange 20' for additional reinforcement. Likewise, an external peripheral flange 22' is shown on the ring section 17'. However, instead of providing lugs 23 on the inner peripheral flange 21' and slots 24 in the plate section 16', lugs 23' are formed on the flange 22' and slots 24' are provided in the flange 20' to receive the same with a close working fit, whereby to permit relative axial movement between the sections of the clutch disc as required for engagement and disengagement of the clutch, while holding the sections in true concentric relation and against rotation with respect to one another.

It is believed the foregoing description conveys a good understanding of the objects and advantages of my invention. The appended claims have been drawn to cover all legitimate modifications and adaptations.

I claim:

1. In a friction clutch, the combination with a housing element, a shaft element coaxially disposed with respect to the housing element, the one element being the driving element and the other the driven element, the housing having a friction drive surface on the back face thereof, and a back plate on the housing having a friction drive surface on the inside thereof, of a clutch disc mounted on the shaft between the two drive surfaces, said disc comprising a sheet metal plate section having a center hub mounted on the shaft, and a sheet metal ring section, the the plate section engaging the one drive surface and the ring section engaging the other drive surface, said sections being arranged to move apart for engagement of the clutch and toward each other for disengagement, and means for moving the sections relative to each other, said plate section being dished centrally, and said ring section being provided with an annular flange on the inner periphery for reinforcement, said ring having a plurality of circumferentially spaced lugs projecting from said flange and slidably received in slots provided therefor in the centrally dished portion of the plate section so as to keep the sections coaxially disposed and prevent rotation relative to one another.

2. In a friction clutch, the combination with a flywheel driving element, a driven shaft element coaxially disposed with respect to the flywheel, the flywheel having a driving surface on the back face thereof, and a back plate on the flywheel providing a driving surface on the inside thereof, of a clutch disc mounted on the driven shaft between the two driving surfaces, said disc comprising a sheet metal plate section dished centrally to define a marginal driving portion for engagement with one of said driving surfaces and having a center hub mounted on the shaft, and a sheet metal ring section of substantially the same diameter as the plate section but wider than the marginal portion of the plate section and adapted for engagement with the other driving surface, said sections being adapted normally to have engagement with the driving surfaces, levers disposed between and connected with said sections and extending therefrom for operation outside the clutch disc, said levers being arranged when operated to move the sections toward each other to disengage the clutch, the ring section being provided with an annular internal flange for reinforcement, the same projecting toward the central dished portion of the plate section, and a plurality of circumferentially spaced lugs projecting from said flange and slidably received in slots provided therefor in the central dished portion of the plate section to keep the sections coaxially disposed and prevent rotation relative to one another.

3. In a friction clutch, the combination with a housing element, a shaft element coaxially disposed with respect to the housing element, the one element being the driving element and the other the driven element, the housing having a friction drive surface on the back face thereof, and a back plate on the housing having a friction drive surface on the inside thereof, of a clutch disc mounted on the shaft between the two drive surfaces, said disc comprising a plate section having a center hub mounted on the shaft and a ring section, the plate section engaging the one drive surface and the ring section engaging the other drive surface, a plurality of levers disposed substantially radially with respect to the clutch disc and in substantially uniformly spaced relation circumferentially thereof, each of said levers having pivotal support on the one section intermediate its ends and pivotal support on the other section at its outer end, and a concentration ring surrounding the shaft and connected with the inner ends of said levers, the plate and ring sections being moved apart for engagement of the clutch when the levers are moved in one direction and being moved toward each other for disengagement of the clutch when the levers are moved in the opposite direction, said ring being provided with radial guides for sliding movement therein of the inner ends of said levers, and a spring plate secured to the ring and having spring fingers bearing upon the inner ends of said levers to hold the same yieldingly in place in the guides.

4. In a friction clutch comprising a housing element, a shaft element coaxially disposed with respect to the housing element, the one element being the driving element and the other the driven element, the housing having a friction drive surface on the back face thereof, a back plate on the housing having a friction drive surface on the inside thereof, a clutch disc mounted on the shaft between the two drive surfaces, said disc comprising a plate section having a center hub mounted on the shaft, and a ring section, the plate section engaging the one drive surface and the ring section engaging the other drive surface, a plurality of levers disposed substantially radially with respect to the clutch disc and in substantially uniformly spaced relation circumferentially thereof, each of said levers being of stamped sheet metal construction substantially channel shaped in cross-section and pivotally connected by its side flanges near its outer end to the one section and pivotally connected by its side flanges at its outer end to the other section, whereby the sections are arranged to be moved toward each other upon movement of the levers in one direction and spread apart upon movement of the levers in the opposite direction, a concentration ring surrounding the shaft and providing radial guides thereon slidably receiving the backs of the inner ends of said levers, and spring fingers on said ring extending radially therefrom and engaging the front of the inner ends of said levers between the side flanges thereof.

5. In a friction clutch of the character described, a clutch disc comprising a sheet metal plate section dished centrally to define a marginal driving portion for engagement with one of two driving surfaces and having a center hub for mounting the same on a shaft, and a sheet metal ring section of substantially the same diameter as the plate section but wider than the marginal portion of the plate section and adapted for engagement with the other driving surface, said sections being adapted normally to have engagement with the driving surfaces, levers disposed between and connected with said sections and extending therefrom for operation outside the clutch disc, said levers being arranged when operated to move the sections toward each other to disengage the clutch, the ring section being provided with an annular internal flange for reinforcement, the same projecting toward the central dished portion of the plate section, and a plurality of circumferentially spaced lugs projecting from said flange and slidably received in slots provided therefor in the central dished portion of the plate section to keep the sections coaxially disposed and prevent rotation relative to one another.

6. In a friction clutch, a clutch disc comprising front and rear sections, at least one of which has a center hub for mounting the clutch disc on a shaft, said sections being arranged for engagement with opposed drive surfaces when spread apart, the rear section having a forwardly dished central portion, a plurality of release levers disposed with their outer ends between said sections and pivotally connected near their outer ends with the one section and pivotally connected at their outer ends with the other section, the inner ends of said levers extending through openings provided in the dished portion of the rear section for manual operation from behind the clutch disc, spring means tending normally to urge the sections apart, and one or more rearwardly projecting lugs on the front section slidably received in openings provided therefor in the dished portion of the rear section to hold said sections against rotation relative to one another.

CARL A. RUESENBERG.